United States Patent
Englert et al.

(10) Patent No.: US 7,500,151 B2
(45) Date of Patent: Mar. 3, 2009

(54) DATA LOGGING IN A MOTOR VEHICLE

(75) Inventors: Sascha Englert, Ascheberg (DE);
Ottmar Gehring, Kernen (DE); Carsten Hämmerling, Ehningen (DE); Harro Heilman, Ostfildern (DE); Andreas Schwarzhaupt, Landau (DE); Gernot Spiegelberg, Heimsheim (DE); Armin Sulzman, Oftersheim (DE)

(73) Assignee: Daimler AG, Stuttgart (DE)

( * ) Notice: Subject to any disclaimer, the term of this patent is extended or adjusted under 35 U.S.C. 154(b) by 18 days.

(21) Appl. No.: 10/583,603
(22) PCT Filed: Nov. 19, 2004
(86) PCT No.: PCT/EP2004/013151
§ 371 (c)(1),
(2), (4) Date: Nov. 28, 2006
(87) PCT Pub. No.: WO2005/064546
PCT Pub. Date: Jul. 14, 2005

(65) Prior Publication Data
US 2007/0174684 A1    Jul. 26, 2007

(30) Foreign Application Priority Data
Dec. 20, 2003   (DE)   ................. 103 60 125

(51) Int. Cl.
G06F 11/00 (2006.01)
(52) U.S. Cl. .......................... 714/45; 701/35
(58) Field of Classification Search ........................ None
See application file for complete search history.

(56) References Cited

U.S. PATENT DOCUMENTS 4,271,402 A    6/1981  Kastura et al.

(Continued)

FOREIGN PATENT DOCUMENTS

DE         100 46 832 A1    3/2002

(Continued)

Primary Examiner—Christopher S McCarthy
(74) Attorney, Agent, or Firm—Fitch, Even, Tabin & Flannery; Norman N. Kunitz

(57) ABSTRACT

The invention relates to a method for logging messages on a data bus and temporarily storing the sent messages in a cyclically overwritable volatile storing means. The temporarily stored messages can be examined in a targeted manner for attributes of interest by using a verification program. A storage of the temporarily stored messages in a non-volatile second storing means can be initiated by means of definable trigger events that, for example, are formed from individual or a number of attributes of the messages. To this end, the occurrence of the defined trigger event is determined by a monitoring unit, and the data content of the volatile storing means are subsequently transferred into the storage locations of the non-volatile storing means.

The principal advantage achieved with the above method resides in the possibility of backtracking the bus traffic. The exchanged messages may be backtracked and thus provide for the possibility to determine from which process and from which control device was the error message sent on the bus. This assists in a decisive manner in the error-seeking in complex communications networks. By means of the backtracking of the error message or with the analysis as to which message has eventually triggered an error in the communications network, it may be ascertained which process is responsible for the error and which program step triggered it. The error-seeking in the software programming of complex control device combination is thereby decisively facilitated.

11 Claims, 2 Drawing Sheets

U.S. PATENT DOCUMENTS

| | | |
|---|---|---|
| 6,256,594 B1 | 7/2001 | Yamamoto et al. |
| 6,609,051 B2 * | 8/2003 | Fiechter et al. .............. 701/33 |
| 7,096,101 B2 * | 8/2006 | Sonnenrein et al. ........... 701/29 |
| 7,302,320 B2 * | 11/2007 | Nasr et al. .................... 701/22 |
| 2004/0044639 A1 * | 3/2004 | Schoenberg et al. ........... 707/1 |
| 2004/0112124 A1 * | 6/2004 | Sonnenrein et al. ........ 73/118.1 |

FOREIGN PATENT DOCUMENTS

| | | |
|---|---|---|
| DE | 101 02 061 A1 | 10/2002 |
| DE | 101 43 556 A1 | 3/2003 |
| EP | 1 118 965 A1 | 7/2001 |
| FR | 2 756 050 A1 | 11/1996 |

\* cited by examiner

DATA LOGGING IN A MOTOR VEHICLE

CROSS REFERENCE TO RELATED APPLICATION

This application is the National Stage filing under 35 U.S.C. 371 of International Application No. PCT/EP2004/013151, filed Nov. 19, 2004, and claims priority of German Patent Application 103 60 125.2, filed Dec. 20, 2003, the subject matter of which in its entirety, is incorporated herein by reference

BACKGROUND OF THE INVENTION

The invention relates to a method of logging messages sent over a data bus in a motor vehicle between electronic units. Selected critical messages may be temporarily stored and later, at a suitable point in time, transferred into a data processing device externally of the motor vehicle, where such critical messages may be analyzed in more detail.

German Offenlegungsschrift DE 101 21 061 A1 discloses a monitoring apparatus and a monitoring system for a data bus which is provided in a motor vehicle and on which messages are sent between electronic units. Several electronic units are connected to the data bus by a bus interface, and the communication network in the motor vehicle has a data interface, by means of which an error memory may be read into a data processing device externally of the motor vehicle. As a difference from the presently claimed invention, however, in the monitoring method according to the DE 101 21 061 A1, the messages on the bus are verified directly by a monitoring unit without temporary storage. The verification is performed with a list which is stored in a memory of the monitoring unit and in which all the permitted messages occurring on the bus are enumerated. In case on the bus a message appears which is not present in such a list, then such a foreign message is submitted to an evaluation, and an evaluating unit signals an endangering potential which may emerge from the foreign message. In case the thus determined endangering potential exceeds a previously given threshold value, an error signal is entered into an error memory. Such a known monitoring system serves for recognizing, whether all connected bus participants also have a corresponding access privilege to the bus. This may cause a problem in motor vehicles if control devices are subsequently installed without a corresponding clearance being available from the vehicle manufacturer for such control devices. In such a case a control device not cleared for installation could not be immediately recognized by the monitoring apparatus according to the DE 101 21 061 A1.

German Patent Application DE 100 46 832 A1 describes an apparatus and a method for detecting travel data of a motor vehicle. The travel data are logged in an accident recorder. The latter consists essentially of a memory device which is a continuous memory and whose memory contents are cyclically overwritten. In this manner the recorded data are always preserved for a predetermined time period before they are continuously overwritten by the actual data upon lapse of the predetermined time period. The travel data are directly stored in the accident recorder. A bus monitoring or an analysis of bus messages is not provided, nor is a readout of the accident recorder during normal operation of the motor vehicle.

Possibilities of a bus access during the operational period of a motor vehicle are known from the vehicle management system in German Offenlegungsschrift DE 101 43 556 A1. The control devices in the motor vehicle may be accessed by an air interface, and a telematic-CAN-data bus as well as by a CAN-gateway. The access itself is tied to an access privilege. A monitoring of the bus traffic concerning error events or error messages is not performed.

Bus messages are not logged in any of the above-discussed processes. It is therefore not possible with any of the known methods or with any combination thereof to more closely analyze an error-encumbered bus traffic. This is achieved only by the invention.

The inventors were therefore faced with the object to develop, for further advancement and for the elimination of errors in the existing software of control devices in a motor vehicle, a data capture which assists in tracking down such software errors.

SUMMARY OF THE INVENTION

This object is achieved with a method according to the features of claim 1. Advantageous aspects of the method according to the invention are contained in the dependent claims and in the description of the embodiments.

The solution succeeds in particular by logging messages on the data bus and temporarily storing the sent messages in a cyclically overwritable, volatile memory. The messages stored temporarily in this manner may be examined in a targeted manner for the attributes of interest by means of a verification program. By means of definable triggering events which, for example, may be formed from individual or several attributes of the messages, a storing of the temporarily stored messages in a non-volatile second memory means may be initiated. For this purpose, the occurrence of the defined triggering event is ascertained by a monitoring unit, and the data content of the volatile memory means is subsequently transferred into the memory cells of the non-volatile memory means.

The advantage principally achieved with the above process resides in the possibility of backtracking the bus traffic. The exchanged messages may be backtracked and thus provide for the possibility to ascertain which process and which control device sent the error message onto the bus. This decisively aids in the error-seeking in complex communication networks. By means of the backtracking the error message or by means of an analysis as to which message has eventually triggered an error in the communications network, it may be ascertained as to which process is responsible for the error and which program step has triggered it. The error-seeking in the software programming of combinations of complex control devices is decisively facilitated in this manner.

According to an advantageous embodiment of the method, the definable trigger event may be exchanged over a data interface of the communications network. By means of the trigger event, the error-seeking may be controlled in a targeted manner, and only the occurrence of certain error events is logged in the non-volatile storing means. Since the trigger event decisively determines which message can be evaluated as an error message, by means of a suitable definition of the trigger event and by means of its exchangeability, a flexible and targeted error-seeking may be established in the communications network.

According to another advantageous embodiment of the method, by means of parameterizable attributes which may be exchanged over a data interface of the communications network, it may be established which messages on the bus are to be logged and temporarily stored in the storing means. In case of a CAN-bus system, such parameterizable attributes may be, for example, the so-called CAN-identifiers which may be sent to the monitoring unit as a parameter list. The monitoring unit then will temporarily store only those messages on the CAN-bus, whose identifier is contained in the parameter list. Further possibilities for the parameterizable attributes are selected error codes which are contained in the CAN-communication or selected bits within the CAN-communication whose fold-down indicates an error. This has the advantage that not all messages present on the bus need to be logged in the temporary memory, and that the analysis of the temporarily stored messages is limited to the previously selected messages.

According to a further advantageous embodiment of the method, the non-volatile memory is read into an external electronic data processing device outside the motor vehicle. In such an external data processing device a more accurate analysis of the logged messages may be performed with a diagnostic program. Preferably, the data interface for reading the non-volatile memory may be a so-called air interface. As an air interface there is meant a wireless-based transfer by a mobile radio or by a telematic CAN bus or by other wireless-based data. The reading of the non-volatile memory is triggered by the external data processing device. In this arrangement the advantage of logging error messages in a non-volatile storing medium in the motor vehicle proper manifests itself. Namely, in this manner error messages do not become lost once they occur and they may be analyzed in more detail in principle at a later, arbitrarily chosen time. For its removal, the error does not have to occur exactly when a qualified servicing engineer is on site at the motor vehicle.

In the description which follows, an embodiment will be set forth in more detail in conjunction with the drawings.

DETAILED DESCRIPTION OF THE INVENTION

Figure 1:
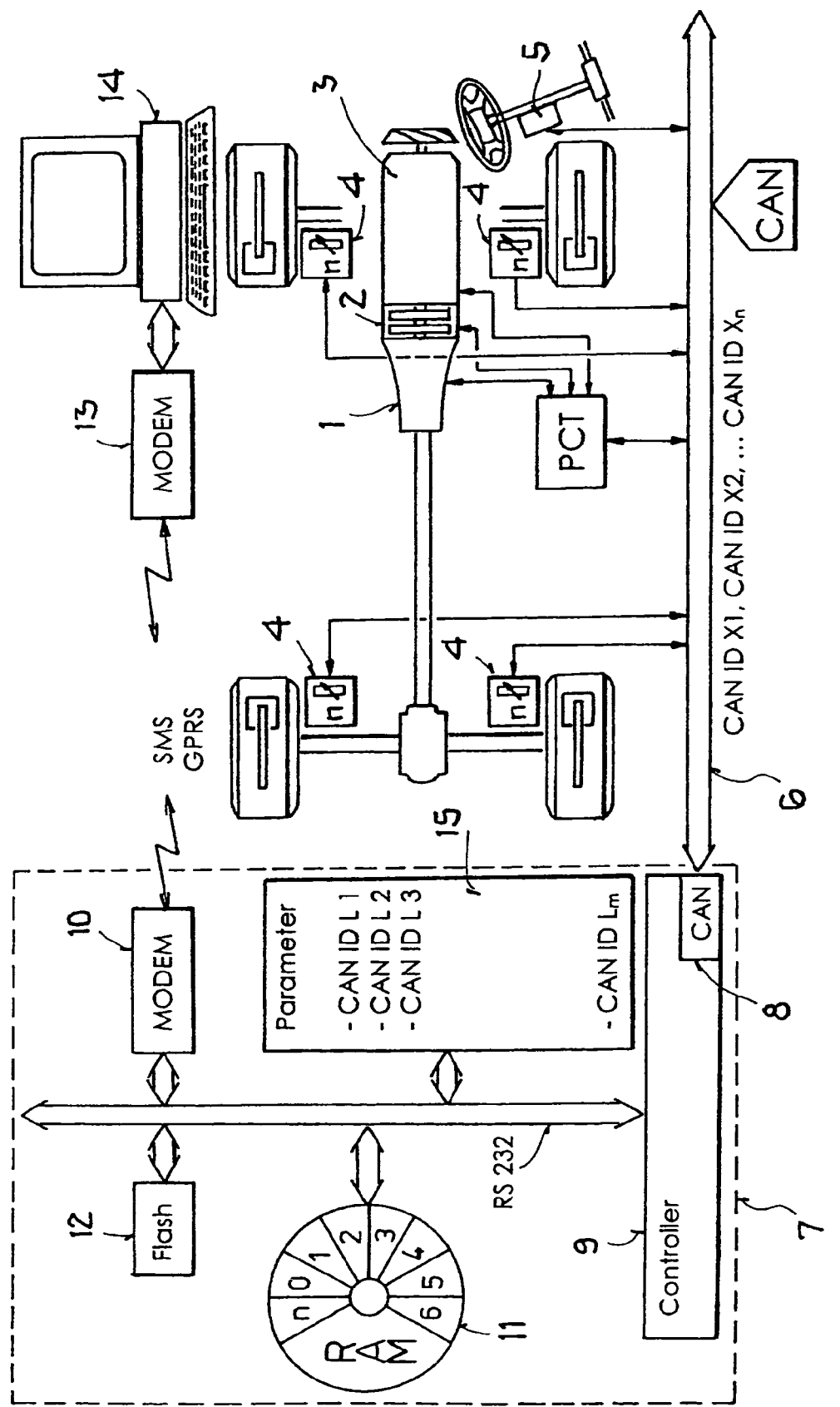
FIG. 1 is a schematic overview showing the most important functions of the invention.

FIG. 1 schematically shows the integrated power train of a motor vehicle. The principal functions are combined in a power train controller (PTC). The power train controller integrates the transmission control apparatus, the engine control apparatus as well as the clutch control apparatus. Therefore, the power train controller is coupled with the transmission 1, the clutch 2 and the engine 3. Further control devices which are important for the operation of the motor vehicle are decentralized. As examples the brake control device 4 and the steering control device 5 are shown. To ensure the highest possible safety against a failure of the control devices and to thus make possible a road-worthiness, the above-noted control devices are redundantly present, since they contain safety-related functions. The control devices proper communicate among one another over a data bus and therefore all have a communication connection with the data bus 6. The data bus is formed preferably as a CAN (Controlled Area Network) bus system. Further, a transfer system 7 is connected to the CAN bus. The transfer system comprises a CAN bus interface 8 which is preferably embedded into a freely programmable processor 9. By means of the transfer system 7 a bi-directional data transfer is effected out of the vehicle and into the control devices thereof. The transfer system therefore further integrates an RS 232 interface, over which, for example, a wireless modem 10 may be integrated into the transfer system 7. Further attributes of the transfer system 7 are a first volatile RAM memory 11 (Read and Access Memory) and a second non-volatile memory 12 which is preferably a so-called flash. Both storing media may be integrated into the controller or, as illustrated in FIG. 1, may be accessed by the controller 9 over a serial interface. By means of the wireless modem 10, communication may be established with an external, further wireless modem 13 over established mobile wireless standards, such as GSM, SMS or GPRS. The external wireless modem 13 is connected to an external data processing device 14. Further transfer methods considered for the wireless connection are: the Bluetooth standard, the IEEE802.11 WLAN standard and the UMTS-IMT-2000 standard. Less considered for the wireless transfer process are, for example, the DECT standard, the ISM band or the Hyperlan2 standard.

By means of such a transfer system 7 located in the vehicle, for example, a remote diagnostic system, implemented in the external data processing device 14, is in a position to act upon the power train controller PTC and upon the other control devices connected to the CAN bus in the vehicle and to thus also affect the vehicle to be monitored.

Figure 3:
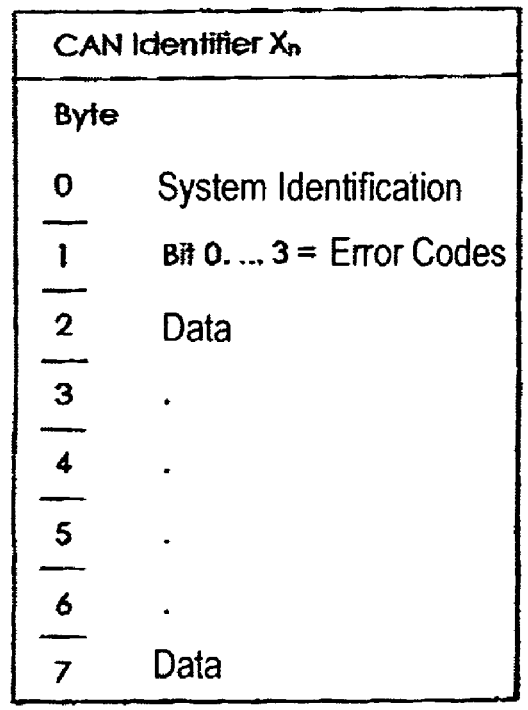

The principal task of the transfer apparatus is, however, the logging of messages which are exchanged on the data bus between the control devices in the vehicle. For this purpose, the controller 9 has its own processor in which an executable program is implemented. The process is performed by means of the executable program and the apparatus attributes of the transfer apparatus 7 as defined in the claims. All the messages on the data bus—preferably a CAN bus—are logged over a bus interface 8, preferably a CAN bus interface. All logged messages are temporarily stored in a first volatile storing medium 11. The volatile storing medium 11 may be a RAM. To save storage capacity, the memory is a so-called ring memory, that is, the memory registers are, starting with the first memory register, successively fully written, until the last memory register n is also occupied. Thereafter the already stored bus messages are cyclically overwritten by the newly incoming bus messages, again starting with the first memory register. A second principal task of the executable program is the analysis of the read bus messages. Such an analysis may be performed to a certain extent online while the bus messages on the bus are being read, or the analysis of the bus messages occurs while they are temporarily stored in the first volatile storing medium. The second alternative of temporary storing has the advantage that more time is available for the analysis. The analysis of the bus messages may extend to the transmitter and data of the messages as well as to the useful contents of the message. By means of the executable program the read message or the temporarily stored message is examined for certain attributes which are presented to the program as an attribute list. The attribute list may be parameterizable, by which it is meant that the individual attributes may be exchanged as parameters as required and according to the purpose of examination. Such an exchange may be performed by the external data processing device 14 over the wireless interface as a download process in which a new actualized attribute list 15 is inputted in an accessible storing medium in the transfer apparatus 7. In the embodiment according to FIG. 1 as attributes which can be monitored, the identifiers of the CAN communications: CAN ID L1, CAN ID L2, . . . CAN ID Lm are exemplarily named. More detailed discussion is given in the description of FIG. 3.

If the executable program in the read or simultaneously stored bus messages ascertains the presence of an attribute to be monitored, the cyclic overwriting of the volatile storing medium 11 is stopped by the newly incoming bus messages, and the memory content of the volatile storing medium 11 is transferred to a second non-volatile storing medium 12 which is preferably a flash memory. Upon conclusion of the transfer process, the cyclic overwriting of the first volatile storing medium 11 may resume. As soon as a storing step occurred in the non-volatile storing medium 12, in a further process step a first message, preferably as a mobile wireless message, is prepared which means that on the data bus an event of interest has taken place. The attributes to be monitored and transferred with the attribute list 15 namely act as trigger events to secure the data content of the first volatile storing medium to ensure that it will be available for a later query in a non-volatile storing medium. The trigger event may consist of a single attribute of a message or of a combination of various attributes which must occur simultaneously or in a given sequence in order to define a trigger event for the prescribed transfer process. The prepared message is transferred preferably over a mobile wireless connection to an external predetermined terminal. Such a transfer process is repeated by the executable program over the modem 10 as often until a connection with the selected call number is in fact established. To this end, one or more telephone numbers are stored in the transfer apparatus 7 in a suitable manner. By virtue of such a message, an external operating person or user of the data processing device 14 is made aware of the fact that an event previously defined as a trigger event has occurred on the data bus of the vehicle to be monitored. Then the user of the data processing device 14 may himself/herself decide, at which point in time does he/she wish to read out the memory content of the non-volatile storing medium 12 over the mobile wireless interface and to submit it to a more accurate analysis in the data processing device 14.

To proceed in such a manner has mainly two advantages.

The securing of logged bus messages in a non-volatile storing medium and the read-out of the non-volatile storing medium as needed, permits a monitoring of the bus traffic independently of whether or not a testing engineer is present. The logged bus traffic allows an analysis at a later point in time which means that the vehicle may continue to be operated, and that an external service station in the form of the data processing device 14 does not need to be continuously manned. By virtue of the fact that not only the trigger event itself was logged, but also, that the messages previously exchanged on the bus were logged according to the memory size of the volatile storing medium 11, it is feasible to analyze not only the trigger event proper, but also the history which transpired before the occurrence of the trigger event on the communications network of the motor vehicle. This is very helpful particularly in error-seeking in the software programs of the control devices. By means of the logging of the complete bus messages, a direct indication is given as to which process and thus which control device and which software have sent an error message to the bus. This is a very important information for the beginning of the error-seeking.

The second advantage of the automated logging resides in that it is not necessary to have a service technician on site if occasionally a rarely occurring error appears. Namely, a once-reported, rarely occurring error may be defined as a trigger event and is then logged with the transfer apparatus 7 in an automated manner and preserved in a lasting permanent storing medium 12, so that even rarely occurring errors may be tracked down.

According to an advantageous embodiment, the non-volatile storing medium may have a larger storage capacity than that of the volatile storing medium 11. This has the advantage that the volatile storing medium 11, dependent upon the size of the non-volatile storing medium 12, may be read out in a multiple manner before the non-volatile storing medium 12 must be reset. In this way several trigger events may be advantageously logged and stored in a non-volatile manner.

Figure 2:
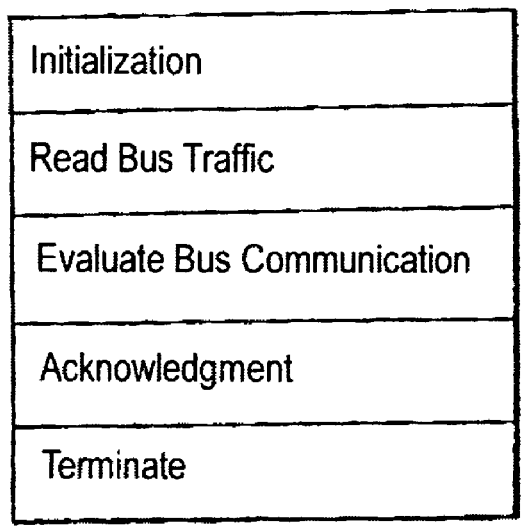
FIG. 2 is a diagram showing the layout of a main program as it may be used in conjunction with the invention and FIG. 3 is a simplified illustration of the structure of a CAN-communication.

FIG. 2 shows an exemplary application of the executable program, with which the method according to the invention is performed. The structure of the program may be theoretically divided into five main components, namely, the initialization, the reading of the bus messages, the evaluation of the communications on the bus, the acknowledgment to an external data processing device as well as the termination of the monitoring process upon turning off the motor vehicle.

The initialization serves for the preparation of the transfer apparatus. Among others, the real-time clock and the modem are started. Further, diverse variables and objects are defined which are necessary for operating the program. These are in particular the trigger events and the attributes or parameters which are to be separately monitored. These parameters or trigger events may be loaded into the processor from a storing medium or they may be newly read over the mobile wireless interface and newly defined by the external data processing device. The second step is performed preferably over a flash process.

The bus messages are read during the second program part. In this case there are read both the data on the data bus of the vehicle, mostly on the CAN bus, and, if available, SMS messages which have arrived over the modem 10. This program step serves to render available the data of the communication interface for the subsequent functions.

In the next program part which is "evaluate bus communication",the bus communications on the data bus and on the modem interface are read. The data on the data bus are, as previously noted, cyclically logged in the volatile storing medium 11, and the modem interface is monitored for the presence of external messages. In case external messages are present, they are read-in and evaluated without delay. In case the external messages contain commands, such commands have a priority in the further processing and are executed with priority. Such commands may pertain particularly to the read-out of the non-volatile memory. A flash process can also be performed, with which software programs are implemented in the control device or with which the attribute list 15 is to be newly read-in or with which a new trigger event may be determined. With the aid of the defined trigger events and the attribute list 15 the read bus messages are monitored and analyzed.

In case a previously defined event occurs, the program part "Acknowledgment" stops the cyclical overwriting of the volatile storing medium 11 and its memory content is transferred to the non-volatile storing medium 12. Thereafter an SMS is prepared, by means of which an external, preset calling address is informed over the modem interface 10 that an event to be monitored occurred and that in response to further query by the external data processing device 14 the data may be read out, also over the modem interface, from the non-volatile storing medium 12.

The last program part "Terminate" serves for an orderly shutdown of the transfer apparatus 7. The orderly shutdown serves particularly for securing any attributes and trigger events newly read into a non-volatile storing medium for ensuring that at a subsequent start of the motor vehicle they are again made available during initialization of the executable program.

The most frequently utilized data bus system in motor vehicles is the so-called CAN bus protocol. Therefore, the structure of a message in a CAN bus system will be briefly discussed in conjunction with FIG. 3. CAN bus systems are so-called non-deterministic bus systems. This means that messages on these bus systems are not directly assigned to the addresses of the control devices, but the message itself is characterized based on a CAN identifier, and the connected control devices decide, based on an identifier list, which messages on the bus should be read. Besides the CAN identifier, a CAN bus message, as a standard, contains 8 bytes with 0-7 useful data. Into which byte which useful data are inputted, depends to a large measure from the application programmer. Thus, for example, into byte 0 characteristic data concerning system recognition may be inputted. These may be particularly CAN data which characterize a specific control device in the network. Frequently error information is inputted into the byte 1. Such error information may be inputted as error codes, or merely individual bits from the byte, for example, the bits 0-3 may indicate an error by changing their value from a logic 0 to a logic 1. In the other bytes system data may be exchanged on the bus, particularly travel data in motor vehicle applications. In the concrete application example of FIG. 1, these travel data are used for operating an automatically driven, driverless transport system. The core of the driverless transport system is an integrated power train which consists of the electronically controllable standard components: engine and transmission. To this are added a steer-by-wire steering and a brake-by-wire braking system. Since each of these X-by-wire systems can be controlled by purely electronic commands, their combination results in a complete, electronically controllable power train which is monitored and controlled by a unitary bus (CAN bus). Such a power train is expanded by coordinating electronics: the power train controller PTC. The travel data to be exchanged over the CAN bus pertain particularly to data for brake actuation, steering actuation, the set transmission stage, the vehicle position and the vehicle speed. A bus communication of this kind may be examined according to the invention by the transfer apparatus 7 concerning various attributes. On the one hand, the identifier, the so-called CAN identifier, may be utilized as a trigger event or as an attribute to be monitored. On the other hand, the data for system recognition may be used for monitoring or the measures for an error characterization may be used for a monitoring process and for the initialization of a data logging into the non-volatile memory 12. The monitoring itself of the travel data may be utilized as a deciding criterion for the definition of a trigger event. It may be, for example, monitored whether a permissible maximum speed has been exceeded, whether in case of a braking process all the brakes are actuated, whether in case of an applied reverse gear the travel program for reverse travel is also activated, etc.

As already noted at the beginning, if for no other reason than for purposes of approval, the control devices in automated vehicles are, as a rule, redundantly designed. The fallback plane of the control devices then preferably also has a second, independent CAN bus as a communications network. In such a communications network with two CAN buses the transfer apparatus 7 is to be expanded by a second CAN interface. In such a case then both CAN buses are read parallel.

The invention claimed is:

1. A method of reading messages which are sent over a data bus in a motor vehicle between electronic units, comprising:

providing at least one communications network based on at least one data bus to which several electronic units are connected by a bus interface, connecting the communications network with an external data processing unit by at least one data interface, storing of messages which were sent in the communications network in at least one cyclically overwritable, volatile storing means, examining the messages stored in the volatile storing means for selected, parameterizable attributes with at least one monitoring unit having an executable program, upon the occurrence of at least one definable trigger event, whose occurrence is monitored by the executable program, stopping the cyclical overwriting of the volatile storing means for at least as long until the data content of the volatile storing means is transferred to a second, non-volatile storing means.

2. The method as defined in claim 1, wherein the definable trigger event may be read or exchanged over the data interface of the communications network.

3. The method as defined in claim 1, wherein the parameterizable attributes may be read or exchanged over the data interface of the communications network.

4. The method as defined in claim 1, including reading the data content of the non-volatile storing means, upon request by an external electronic data processing device, into the external electronic data processing device over the data interface of the communications network.

5. The method as defined in claim 1, including forming the trigger event from a logic or time-related concatenation of the parameterizable attributes.

6. The method as defined in claim 1, wherein the data bus is a CAN bus and the data interface is a serial interface or a modem interface.

7. The method as defined in claim 6, wherein the modem interface is a mobile wireless interface based on the standards of SMS, GSM or GPRS.

8. The method as defined in claim 1, wherein the parameterizable attributes are CAN identifier, error bits, error codes or selected travel data of the motor vehicle.

9. The method as defined in claim 1, including defining and monitoring several trigger events.

10. The method as defined in claim 1, including after occurrence of a trigger event, effecting a notification to an external data processing device concerning the occurrence of the event.

11. The method as defined in claim 10, including reading the data content of the non-volatile storing means, after sending the notification, into an external electronic data processing device at the request thereof.

* * * * *